Sept. 9, 1924.
D. STRULSON
FOLDING COMB AND MIRROR
Filed June 3, 1924
1,508,306
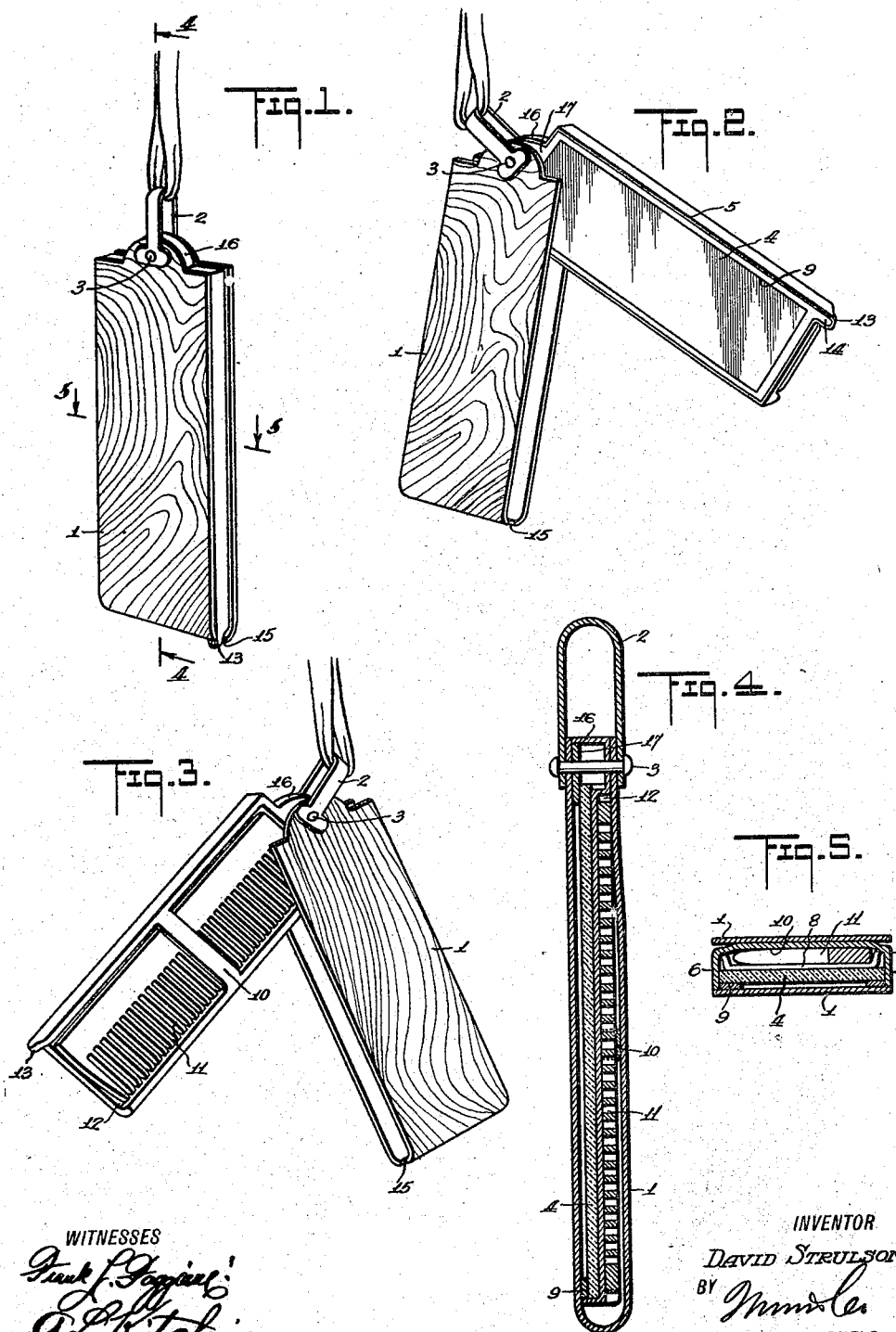

Patented Sept. 9, 1924.

1,508,306

UNITED STATES PATENT OFFICE.

DAVID STRULSON, OF BRONX, NEW YORK.

FOLDING COMB AND MIRROR.

Application filed June 3, 1924. Serial No. 717,615.

*To all whom it may concern:*

Be it known that I, DAVID STRULSON, a citizen of the United States, and a resident of the Bronx, county of Bronx, and State of New York, have invented a new and Improved Folding Comb and Mirror, of which the following is a full, clear, and exact description.

This invention relates to a combined comb and mirror and has for an object to provide an improved structure wherein the parts are arranged to present a pleasing appearance while at the same time they may be adjusted and separated to perform their various functions.

Another object of the invention is to provide a combined mirror and comb wherein the frame of the mirror acts as a storage structure for the comb.

A still further object of the invention is to provide a combined comb and mirror wherein the mirror and comb are swingably connected with a housing and also wherein the parts are so associated together that the comb may be bodily disconnected from the mirror to be used independent thereof.

In the accompanying drawings—

Figure 1 is a perspective view of a folding mirror and comb disclosing an embodiment of the invention.

Fig. 2 is a view similar to Fig. 1 but showing the parts swung to an outer position.

Fig. 3 is a view similar to Fig. 3 but showing the opposite side of the structure.

Fig. 4 is a vertical sectional view through Fig. 1 approximately on line 4—4 the same being on an enlarged scale.

Fig. 5 is a transverse sectional view through Fig. 1 approximately on line 5—5 the same being on an enlarged scale.

Referring to the accompanying drawing by numerals, 1 indicates what may be termed the frame, and 2 a yoke pivotally connected thereto by the pin 3. The frame 1 is preferably formed from a single piece of material into a U-shaped structure which is consequently open on both sides and one end. This material may be metal, celluloid or other desired material and the same is preferably ornamented on the outer surface. Associated with the frame 1 is a mirror 4 mounted in the mirror casing or housing 5. The casing 5 is preferably formed from a single piece of material which may be metal, celluloid or other suitable material. When forming the casing 5, the edges are pressed for forming side flanges 6 and 7 while the central part is depressed for forming a back 8 for the mirror 4. A retaining beading 9 is mounted on the edge of the mirror 4 and secured to the casing 5 in any desired manner as for instance, by an adhesive. When pressing the central part 8 downwardly, a small section or strap 10 is pressed upwardly out of the blank from which the casing is made whereby a retaining bar or strap is provided for holding the comb 11 in the recess or chamber 12 formed by pressing the central part of the frame downwardly. When the parts are made of metal or celluloid, there will be resilient action between the various parts whereby the strap 10 will act to retain the comb 11 in its assembled position as shown in Fig. 3 though permitting ready removal whenever desired. It will be noted that by depressing the central part 8, a chamber 12 is provided whereby the comb is set within the casing 5 and thereby presents a very compact structure. When the comb and mirror are assembled as shown in Fig. 3 they may be readily swung into and out of the frame 1. The casing 5 is preferably provided with an extension 13 which is stiffened by an extension 14 of the beading 9, said extensions fitting into a notch 15 formed in frame 1. Also, preferably the extension 13 projects a short distance beyond the frame 1 as indicated in Fig. 1 whereby the same may be engaged by the thumb or finger for swinging the mirror or associated parts outwardly. It will be noted from the drawing that the casing 5 and beading 6 are provided with extensions 16 and 17 respectively through which the pin 3 extends.

I claim:

1. A folding mirror and comb comprising a substantially U-shaped frame, a mirror, a casing carrying said mirror pivotally connected with said frame so as to swing into and out of the frame, a comb, and means for retaining the comb in said casing when not in use, said means holding the comb in the casing in such a manner that the comb is adapted to swing into and out of said frame with the mirror.

2. A folding comb support and mirror comprising a frame, a casing pivotally mounted on the frame so as to swing into and out of the frame, said casing being formed with a substantially depressed section for receiving a comb on one face and a mirror on the opposite face, means for holding a comb in said casing and means for holding a mirror in said casing.

3. In a folding mirror and comb support, a swinging frame for supporting a mirror and comb, said fame comprising bars or side flanges, a depressed central portion, said central portion being depressed until it is substantially midway the edges of said flanges whereby a comb may be applied to one face and a mirror to the other face, a beading for permanently securing a mirror to said central depressed portion and a strap pressed out of said central depressed portion for temporarily holding a comb against said depressed portion between said flanges.

4. A folding comb and mirror comprising a U-shaped frame open on opposite sides and one end a casing pivotally connected to said frame at the open end so as to swing into and out of the frame from either side, a mirror permanently fixed to said casing in such a manner as to have its outer face below the edges of the casing and a comb removably mounted within said casing, said comb being so positioned as to be within the side edges of said casing.

5. In a combined comb and mirror, a casing, a mirror mounted in said casing with its face arranged below the edges of said casing, said casing having a centrally pressed-out bar and a comb removably positioned beneath said bar within said casing, said bar acting to hold said comb in said casing.

DAVID STRULSON.